J. F. HALLER.
FILLING MACHINE.
APPLICATION FILED MAY 23, 1908.

978,154.  Patented Dec. 13, 1910.

WITNESSES
Walter Samariss.
E. Pearl Porter.

INVENTOR
Joseph F. Haller
By Fred'k H. Winter,
His Atty.

UNITED STATES PATENT OFFICE.

JOSEPH F. HALLER, OF SHERIDAN BOROUGH, PENNSYLVANIA.

FILLING-MACHINE.

978,154. Specification of Letters Patent. Patented Dec. 13, 1910.

Application filed May 23, 1908. Serial No. 434,608.

*To all whom it may concern:*

Be it known that I, JOSEPH F. HALLER, a resident of Sheridan borough, in the county of Allegheny and State of Pennsylvania, have invented a new and useful Improvement in Filling-Machines, of which the following is a specification.

This invention relates to filling tubes for machines for filling material into receptacles, and more particularly to tubes for filling bottles with a liquid or semi-liquid substance.

The object of the invention is to provide a tube which will prevent clogging of the vent tube when filling liquid or semi-liquid material into receptacles.

The invention comprises the construction and arrangement of parts hereinafter described and claimed.

Figure 1:
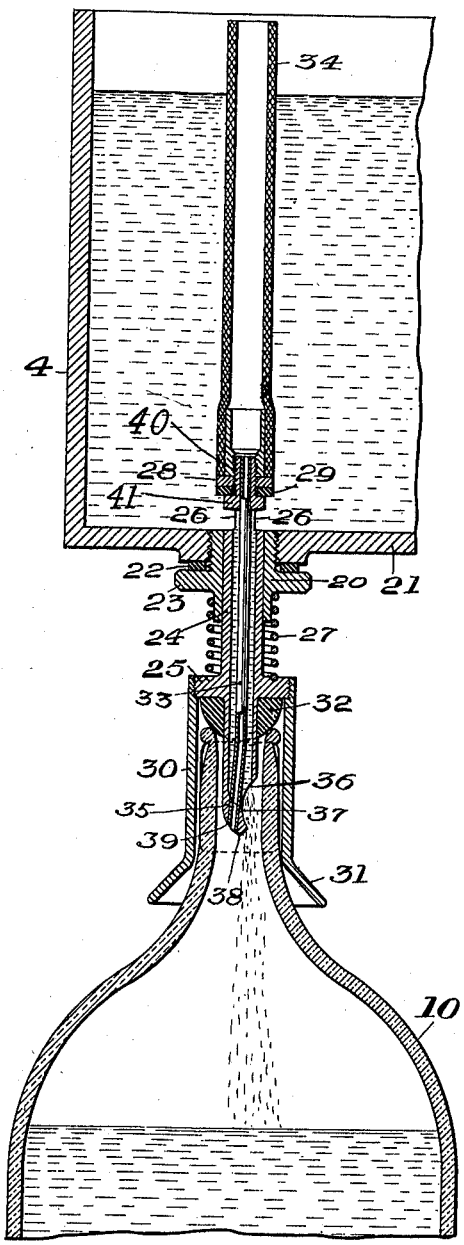
Figure 2:
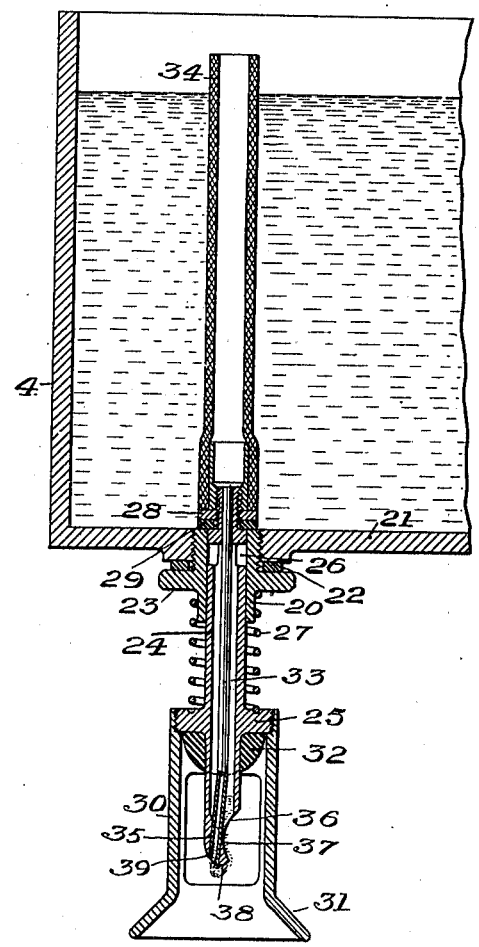

In the accompanying drawings Figure 1 is a vertical section through a filling head and a filling tube showing the same in the act of filling the receptacle, and Fig. 2 is a similar view showing the tube immediately after the filling operation.

My improved tube can be used with filling machines of any type having a vertically movable filling head for projecting the tube into the bottle or other receptacle to fill the latter, and when filled, to withdraw the tube therefrom. In the drawing a portion of a filling head is shown at 4 this being in the form of a tank or receptacle for holding the material to be filled into the bottles or other receptacles. The mechanism for raising and lowering the same is not shown. It can be provided with any desired number of filling tubes. The bottles or other receptacles to be filled are shown at 10.

The filling tube comprises the sleeve 20 screwed or otherwise suitably secured in the bottom 21 of the filling head, a gasket 22 and collar 23 forming a liquid tight connection. Slidably mounted in the sleeve is the filling tube 24, which near its lower end is provided with a collar 25, and at its upper end is closed, but provided with side openings 26 through which the material from the filling head can enter said tube. A spring 27 is interposed between the collar 25 on the tube and the collar 23 on the sleeve 20, said spring normally holding the filling tube depressed or in the position shown in Fig. 2, with the openings 26 below the upper end of the sleeve 20, so shutting off the flow of material from the tube. When the filling head is forced down upon the receptacle to be filled, as shown in Fig. 1, the spring 27 is compressed and the filling tube pushed upwardly to expose the openings 26 above the bottom of filling head, so permitting the material to flow down through the tube. The upper end of tube 24 is provided with a collar 28 which seats a gasket 29 on the upper end of sleeve 20, when the tube 24 is depressed, thereby forming a liquid tight cut-off valve. To the collar 25 is secured the guide 30 preferably flaring at its lower end, as shown at 31, and serving to position the bottle or other receptacle accurately and guide the filling tube down into the neck of said bottle. The filling tube projects below the collar 25 and a stopper 32 of rubber or other suitable yielding material surrounds said downwardly projecting part and serves as a seal for the neck of the bottle while filling.

Extending through the filling tube is a small vent tube 33, the upper end of which is secured in a sleeve 40 which projects upwardly from the upper closed end 41 of the filling tube 24. The sleeve 40 reinforces the tube 33 and enables a very light vent tube to be used. The sleeve 40 is externally threaded to receive the collar 28 and the coupling of the tube or hose 34 which projects above the level of the material in the filling head. The vent tube extends down to the extreme lower end of the filling tube, and is at its lower end bent slightly toward one side of the axis of said filling tube. The outlet from the filling tube is formed by cutting away the side wall thereof, as shown at 36, said cut-away portion being preferably on a curve as shown, and extending down practically to the lower end of the tube. The extreme lower end of the tube around the vent tube is closed, as shown at 35, said closure on the side opposite the discharge opening 36 extending above the lower edge of said discharge opening, presenting a sloping face 37 toward said discharge opening so that the material in the vent tube will slide readily out of the discharge opening. The lower end of the tube is formed practically to a point at 38, immediately adjacent to the open lower end 39 of the vent tube. This opening 38 also provides metal which will protect the light vent tube from becoming battered by hitting the neck of the bottle.

In use, the bottles or other receptacles to be filled are brought under the filling head and the latter is then depressed. The guide 30 passes over the neck of the bottle and guides the filling tube into the same. The seal 32 closes the neck of the bottle, and as the filling head is further depressed the spring 27 is compressed allowing the sleeve 20 to slide down over the filling tube 24 until the openings 26 in the latter are exposed within the filling head. The material then runs down through the filling tube into the bottle or other receptacle, and while the latter is being filled the air contained therein escapes through the vent tube 33 and tube or hose 34. When the bottle is filled to the desired extent the head 4 is lifted in the usual way to withdraw the filling tube from the bottle. When the pressure is relieved the spring 27 expands and forces the filling tube downwardly, thereby closing openings 26 and shutting off the supply. Generally the material is filled into the bottle until it is above the end of the filling tube, so that a small quantity of the material lodges in the lower end of the vent tube. With semi-liquid materials this plugs up the vent tube and has been a source of annoyance. With my tube, however, any material entering the vent tube is automatically siphoned out by the material which is contained in the filling tube when the supply is cut off. On account of the sloping face 37 of the closure for the lower end of the tube the material slides readily out of the tube and down to the point 38 where it forms a drop or globule which also covers the open lower end of the vent tube. When this drop or globule falls off it acts by suction to draw the material out of the vent tube and leaves the latter entirely unobstructed. This effect is, as stated, secured by the formation shown, in which the vent tube opens immediately adjacent to the point on which the drop or globule forms, and furthermore from the shape of the closure for the lower end of the tube which will prevent material remaining in the filling tube from being held therein by capillary attraction, but insuring the discharge of same by gravity. As a consequence this construction avoids a very considerable annoyance which has been experienced in filling tubes as heretofore constructed, and especially when used for filling catsup or other semi-liquid materials into bottles.

What I claim is:

1. In a filling machine, the combination of a filling head, a filling tube carried thereby and having a pointed lower end and provided with a discharge opening on one side extending substantially to the point, and a vent tube extending through the filling tube and opening substantially at the point of the latter, the lower end of said filling tube being closed around the vent tube, said closure on the side opposite the discharge opening extending above the lower edge of the discharge opening to thereby direct the material to the discharge opening and cause the drip to draw the material out of the vent tube.

2. A filling tube comprising a tube having a pointed lower end and cut away on one side to provide a discharge opening extending substantially to the point thereof, and a vent tube extending through said filling tube and opening slightly to one side of the point of said filling tube, the lower end of said filling tube being closed around the vent tube, said closure on the side opposite the discharge opening extending above the bottom of said discharge opening to thereby direct material to the discharge opening and cause the drip to draw material out of the vent tube.

In testimony whereof, I have hereunto set my hand.

JOSEPH F. HALLER.

Witnesses:
 JOHN S. CORT,
 F. W. WINTER.